United States Patent
Surti et al.

(10) Patent No.: US 9,497,613 B1
(45) Date of Patent: Nov. 15, 2016

(54) SYSTEM, METHOD, AND COMPUTER PROGRAM FOR PROVIDING SUBSCRIBER SELECTED ROAMING MOBILE SERVICES

(71) Applicant: Amdocs Software Systems Limited, Dublin (IE)

(72) Inventors: Mitul Anil Surti, Pune (IN); Sanjay Bhatia, Pune (IN)

(73) Assignees: Amdocs Software Systems Limited, Dublin 3 (IE); Amdocs Development Limited, Limassol (CY)

( * ) Notice: Subject to any disclaimer, the term of this patent is extended or adjusted under 35 U.S.C. 154(b) by 0 days.

(21) Appl. No.: 14/547,063

(22) Filed: Nov. 18, 2014

(51) Int. Cl.
*H04W 8/02* (2009.01)

(52) U.S. Cl.
CPC .................. *H04W 8/02* (2013.01)

(58) Field of Classification Search
CPC .............. H04W 8/02; H04W 8/183
USPC .......... 455/433, 432.1, 435.1, 435.2, 435.3
See application file for complete search history.

(56) References Cited

U.S. PATENT DOCUMENTS

2009/0215447 A1* 8/2009 Catalano ............ H04W 48/18 455/432.1
2011/0130118 A1* 6/2011 Fan .................... H04M 15/00 455/411

FOREIGN PATENT DOCUMENTS

WO 2006111176 A1 10/2006

OTHER PUBLICATIONS

Surti, M., U.S. Appl. No. 13/333,891, filed Dec. 21, 2011.

* cited by examiner

*Primary Examiner* — Kamran Afshar
*Assistant Examiner* — Farid Seyedvosoghi
(74) *Attorney, Agent, or Firm* — Zilka-Kotab, PC

(57) ABSTRACT

A system, method, and computer program product are provided for providing subscriber selected roaming mobile services. In use, a plurality of mobile services provided by at least one mobile service provider and available in a zone outside of a home network of a mobile device are determined for the mobile device, the mobile services including at least one voice service, at least one data service, and at least one voice over internet protocol (VoIP) service. The determined mobile services are offered to a user of the mobile device, and a selection from the user of at least two of the mobile services is received. For each of the selected mobile services, an agreement associated with the selected mobile service is generated, information associated with the agreement is provided to a home network operator, and the selected mobile service for the mobile device is authorized.

14 Claims, 4 Drawing Sheets

SYSTEM, METHOD, AND COMPUTER PROGRAM FOR PROVIDING SUBSCRIBER SELECTED ROAMING MOBILE SERVICES

FIELD OF THE INVENTION

The present invention relates to telecommunications networks, and more particularly to providing subscriber selected roaming mobile services in such networks.

BACKGROUND

Currently, when a mobile service subscriber visits a foreign territory outside of a home network, the subscriber uses a roaming facility to continue to use mobile services. This is referred to as roaming and has a strong dependency on a home operator associated with the mobile service subscriber.

In these cases, the home operator may have a pre-defined agreement with an operator in the visited territory, which provides roaming services to the subscriber while the subscriber is roaming. In these cases, the home operator charges the subscriber to use this roaming services. The subscriber does not have a freedom of choice of either the operator or pricing in the visited zone, as it is restricted by the preferred operator in agreement with the home operator.

There is thus a need for addressing these and/or other issues associated with the prior art.

SUMMARY

A system, method, and computer program product are provided for providing subscriber selected roaming mobile services. In use, one or more mobile service offerings are provided to a mobile service subscriber, the one or more mobile service offerings including at least one offering for one or more mobile services in a zone outside of a home network of the mobile service subscriber, and the one or more mobile services being associated with one or more mobile service providers capable of providing the one or more mobile services in the zone outside of the home network of the mobile service subscriber. Additionally, at least one selection of one or more of the mobile services is received from the mobile service subscriber. Further, at least one agreement associated with the selected one or more of the mobile services is generated, the at least one agreement corresponding to an agreement between the mobile service subscriber and the one or more mobile service providers associated with the selected one or more of the mobile services. In addition, information associated with the at least one agreement is provided to a home network operator associated with the home network of the mobile service subscriber. Moreover, the selected one or more of the mobile services are authorized for the mobile service subscriber such that at least one visiting operator associated with the zone outside of the home network of the mobile service subscriber is capable of delivering the selected one or more of the mobile services to the mobile service subscriber when the mobile subscriber is in the zone outside of the home network of the mobile service subscriber.

DETAILED DESCRIPTION

Figure 1:
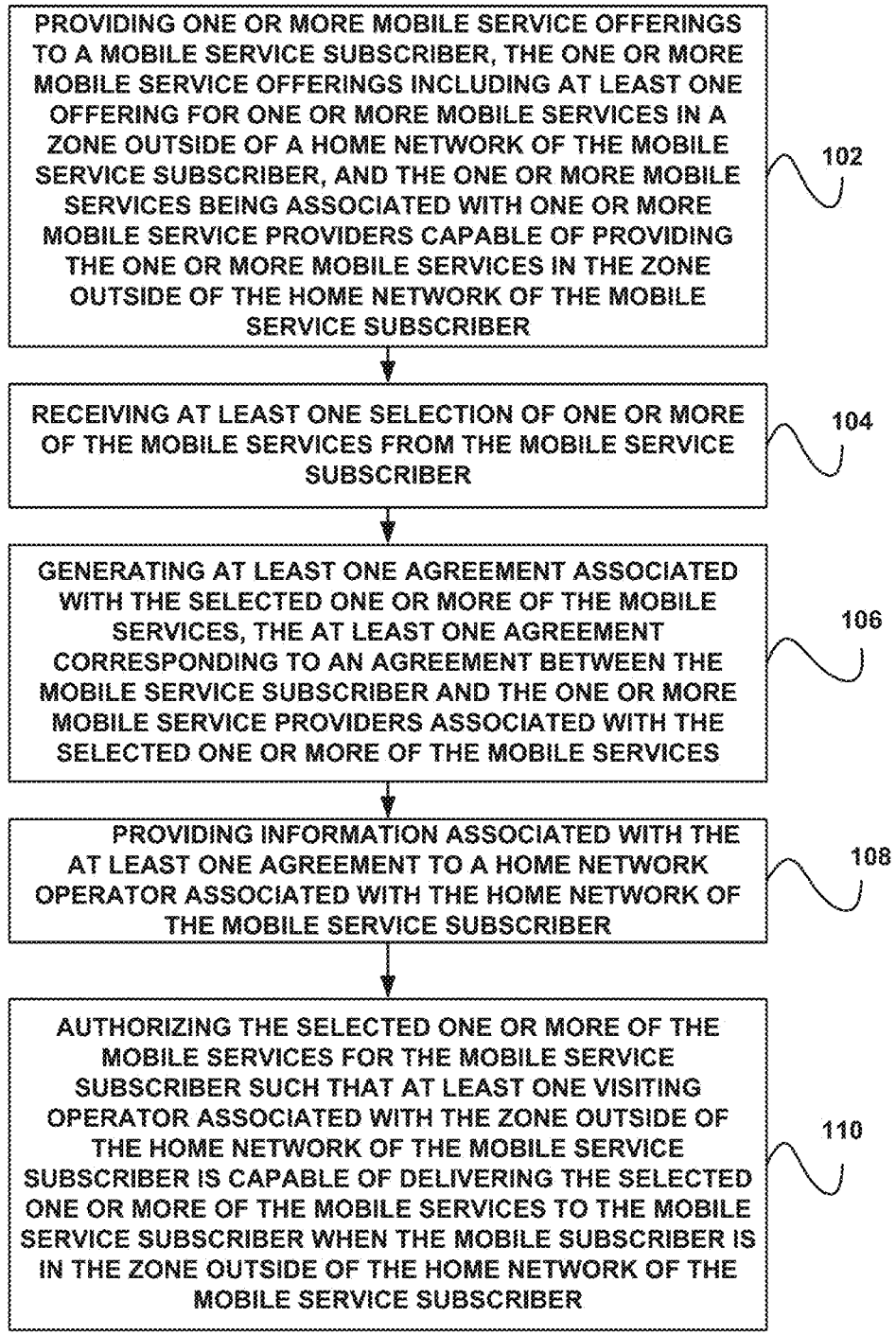
FIG. 1 illustrates a method for providing subscriber selected roaming mobile services, in accordance with one embodiment.

FIG. 1 illustrates a method 100 for providing subscriber selected roaming mobile services, in accordance with one embodiment.

As shown, one or more mobile service offerings are provided to a mobile service subscriber. See operation 102. The one or more mobile service offerings include at least one offering for one or more mobile services in a zone outside of a home network of the mobile service subscriber. The one or more mobile services are associated with one or more mobile service providers capable of providing the one or more mobile services in the zone outside of the home network of the mobile service subscriber.

The mobile service offering may include any offering associated with roaming mobile services. For example, the services may include of voice services, data services, and/or VoIP services, etc. Further, the services may be offered by one or more services providers that may be affiliated with the home network or unaffiliated with the home network.

Additionally, in one embodiment, the providing of the mobile service offerings to the mobile service subscriber may occur prior to the mobile service subscriber entering the zone outside of the home network of the mobile service subscriber. In another embodiment, the providing of the mobile service offerings to the mobile service subscriber may occur subsequent to the mobile service subscriber entering the zone outside of the home network of the mobile service subscriber. As one example, the offers may be provided to the subscriber automatically upon entering the zone outside of the home network of the mobile service subscriber.

The offers may be provided in a variety of forms. For example, the offers may be provided on a website associated with the home network. As another example, the offers may be provided on a third party website. As another example, the offers may be provided in an email, text message, alert, and/or various other advertisements.

The offers may be provided on a mobile device of the subscriber and/or any other device. In various embodiments, the devices may include a mobile phone, a computer (e.g. a tablet computer, a laptop computer, etc.), etc.

Further, the zone outside the home network may include any zone in which the subscriber is considered to be roaming. For example, the zone may include a country that is different than a home country of the subscriber.

As shown further in FIG. 1, at least one selection of one or more of the mobile services is received from the mobile service subscriber. See operation 104. The mobile service subscriber may be capable of selecting a plurality of mobile services from different mobile service providers or services from one service provider. In various embodiments, the selection of the desired services may be facilitated utilizing one or more user interfaces, via a sales representative, and/or utilizing various other techniques.

Further, at least one agreement associated with the selected one or more of the mobile services is generated. See operation 106. The at least one agreement corresponds to an agreement between the mobile service subscriber and the one or more mobile service providers associated with the selected one or more of the mobile services.

In one embodiment, the agreement may be presented to the subscriber for verification and/or signature, etc. The agreement may include any information associated with the selected services and terms/prices associated therewith.

In addition, information associated with the at least one agreement is provided to a home network operator associated with the home network of the mobile service subscriber. See operation 108. The home network operator may store this agreement. Additionally, in response to receiving the information associated with the at least one agreement, the home network operator may authenticate and validate the mobile service subscriber (e.g. to the service provider, etc.).

Moreover, the selected one or more of the mobile services are authorized for the mobile service subscriber such that at least one visiting operator associated with the zone outside of the home network of the mobile service subscriber is capable of delivering the selected one or more of the mobile services to the mobile service subscriber when the mobile subscriber is in the zone outside of the home network of the mobile service subscriber. See operation 110. In this case, the authorization may include the service providers associated with the selected services authorizing the subscriber to use such services, per the terms of the agreement.

The visiting operator associated with the zone outside of the home network of the mobile service subscriber may include any service provider capable of delivering the selected mobile services to the mobile service subscriber. In one embodiment, the visiting operator may be the same mobile service provider that is providing the selected services to the subscriber. In another embodiment, the visiting operator may be a different mobile service provider from the mobile service provider that is providing the selected services to the subscriber.

In either case, authorizing the selected mobile services for the mobile service subscriber may function such that the selected mobile services are capable of being used by the mobile service subscriber without a change in subscriber resources. For example, the subscriber resources may include an IMSI (International Mobile Subscriber Identity), a mobile number, a handset, or a SIM (subscriber identity module), etc., associated with the subscriber.

In one embodiment, confirmation of authorization of the selected mobile services may be provided to the mobile service subscriber. In various embodiments, the confirmation may be in the form of an email, a text message, an icon on a mobile device, and/or various other forms of confirmation.

Once authorized, the at least one visiting operator may deliver the selected mobile services to the mobile service subscriber. The mobile service subscriber may operate as a roaming subscriber while in the zone outside of the home network of the mobile service subscriber but the services available will include the selected mobile services. Further, the home network operator may function as an intermediary between the visiting operator that delivers the selected services and the service provider that provides the services. In this case, the home network operator may have provided the visiting operator with the agreement information associated with the subscriber and the service provider.

Thus, the method 100 enables the subscriber a freedom of choice of an operator in the roaming territory by allowing the subscriber to directly purchase a service from an operator of choice in the visited territory. Additionally, the method 100 allows the subscriber the freedom to purchase different services from different operators in the visited territory (e.g. voice from Operator 1, and data from Operator 2, etc.).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
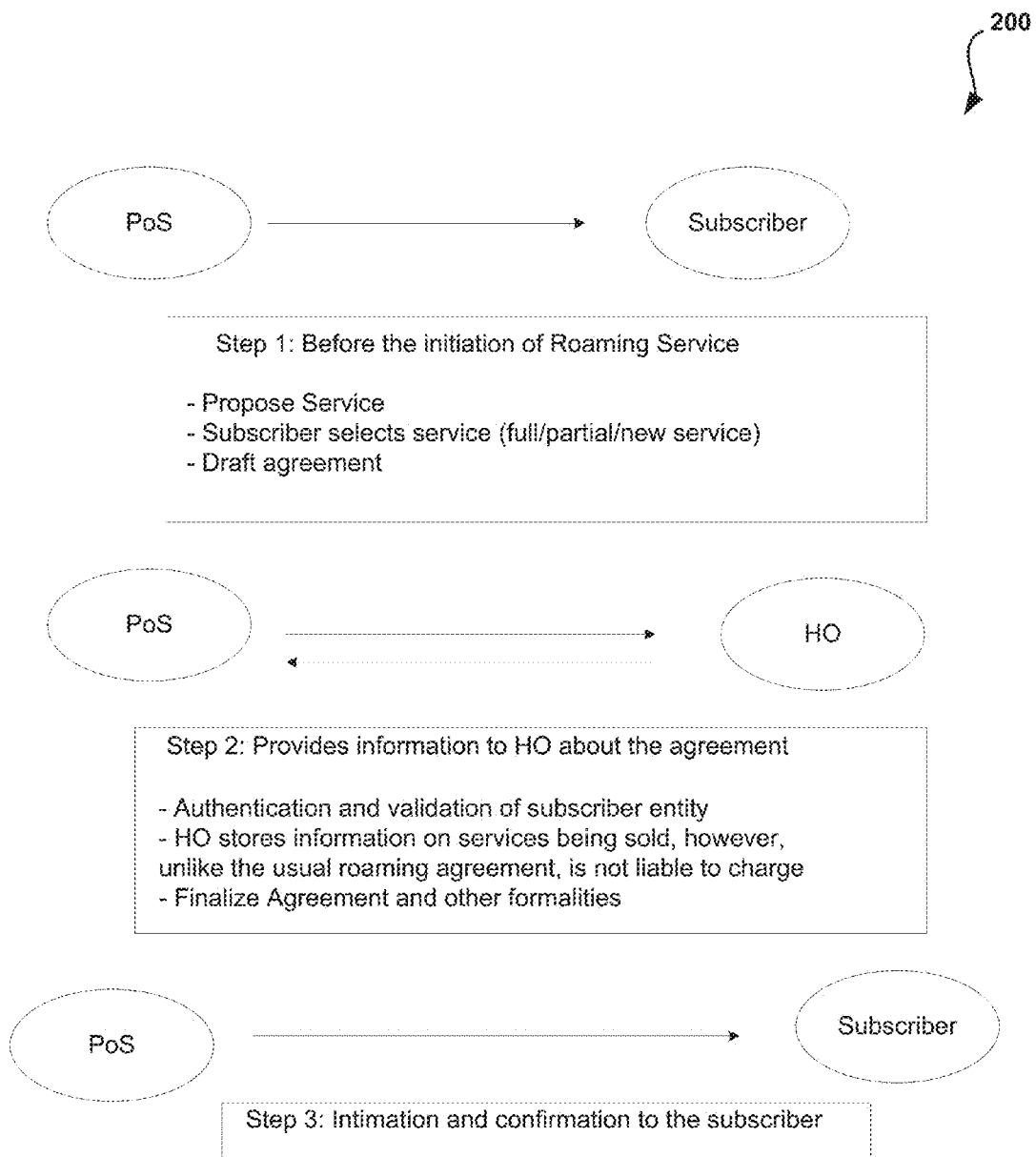
FIG. 2 illustrates a system flow diagram for providing subscriber selected roaming mobile services, in accordance with one embodiment.

FIG. 2 illustrates a system flow diagram 200 for providing subscriber selected roaming mobile services, in accordance with one embodiment. As an option, the flow diagram 200 may be implemented in the context of the details of FIG. 1. Of course, however, flow diagram 200 may be implemented in the context of any desired environment. Further, the aforementioned definitions may equally apply to the description below.

As shown in FIG. 2, before the initiation of a roaming service, a Provider of Service (PoS) proposes at least one service to a subscriber. The subscriber selects a full, partial, or new service and an agreement is drafted.

The Provider of Service then provides agreement information to a Home Operator (HO). The Home Operator provides an authentication and validation of the subscriber entity to the Provider of Service. The Home Operator stores information on services being sold, however, unlike the usual roaming agreement, is not liable to charge. The agreement and other formalities are then finalized. Further, the Provider of Service provides an intimation and confirmation to the subscriber.

Thus, the system provides a mechanism that allows subscribers to choose the Provider of Service in visited zones/countries and purchase roaming services separately and independently of their Home Operators. The entities that play a role in this exchange may include the subscriber, the Provider of Service, a Visited Operator (VO), and the Home Network Operator.

The Provider of Service is namely the operator that proposes a service offering to the subscriber. The subscriber is the user of the service wishing to purchase the offer. The Home Operator is the operator to whom the subscriber belongs, and the Visited Operator is the operator in the roaming territory who would physically provide the service to the subscriber based on the offer purchased by the subscriber.

When a subscriber wishes to travel into a territory not serviced by the Home Network Operator (roaming scenario), the subscriber may choose to purchase one or more roaming services (e.g. voice, data, VoIP, etc.) independently from one or more service providers (Provider of Service) who may have better offers for roaming as compared to the subscriber's Home Operator.

These activities are proposed to enable separate sale of roaming services without a change in subscriber resources (e.g. IMSI, Mobile Number, Handset, etc.).

The Provider of Service and Home Network Operator both would have details of the subscriber and purchase details. The Provider of Service and the Home Network Operator may add this detail in their policy control and routing services for the duration of purchase for call routing.

The Visited Operator is the operator that would physically deliver the services offered by Provider of Service. The Visited Operator may be the preferred partner of the Home Network Operator in the roaming territory. Hence, the Home Network Operator may ensure that necessary information regarding the nature of the services to be offered are shared with the Visited Operator as well.

The subscriber, while roaming in Visited Operator territory, may behave as a regular roaming subscriber for the Visited Operator, however, the services offered to the subscriber would be based on the services negotiated in the agreement with the Provider of Service. For all authentication purposes the subscriber may still behave as a Home Network Operator subscriber, only for service delivery and CDR capture for billing to the subscriber is the subscriber serviced by the Visited Operator.

When the subscriber uses a service, the Visited Operator may request authentication against the plan purchased and provide the service requested, thereby allowing the subscriber on its network. For services that originate events on the Visited Operator (e.g. data services, outgoing voice/ SMS, etc.), the services may be catered as if the subscriber belongs to the Provider of Service itself. For services that terminate on the subscriber (e.g. incoming voice calls), the Home Network Operator may route the terminating event to the Visited Operator, thereby ensuring service delivery to the subscriber.

For billing the subscriber, the liability may be completely on the Provider of Service as the subscriber is currently treated as a Provider of Service subscriber. It should be noted that, the Visited Operator may itself act as the Provider of Service.

The Home Operator may act as an intermediary between the Visited Operator who delivers the services and the Provider of Service who provide the services. From a charging perspective, the Visited Operator may send usage information to the Home Operator. The Home Operator may then analyze this usage in their billing systems and extract the usage for which Provider of Service has an agreement with the subscriber. This extracted usage information may then be sent to the respective Provider of Service who may in effect charge the subscriber.

As an example, a Home Operator (HO1) subscriber may be visiting Country 1. HO1 may have a direct roaming agreement with Visited Operator (VO1).

As a first step, the subscriber, before visiting Country 1, may purchase voice and SMS services from Provider of Service 1, data services from Provider of Service 2 and some content services from Provider of Service 3.

Hence, in this example, HO1 is the Home Operator, VO1 is the Visited Operator and Provider of Service 1, Provider of Service 2, Provider of Service 3 are Provider of Service.

As a second step, when the subscriber decides to purchase the individual services, the Provider of Service will intimate the HO1 Operator of the services offered, which the HO1 will also communicate to the VO1 operator, who will actually deliver the service during the intended duration.

As a third step, VO1 then sends this usage information to HO1.

As a fourth step, HO1 extracts from this usage for individual services and sends the respective usage to corresponding Provider of Service.

As a fifth step, based on the usage received from the HO, the Provider of Service may then bill the subscriber for those services.

It should be noted that the scenario is valid in both a prepaid and postpaid domain.

In the initial scenario, where all services are offered from a single Provider of Service, the Provider of Service itself is acting as a Visited Operator, which eliminates the need of an actual Visited Operator.

The techniques provided herein provide a choice of a Provider of Service, residing in the hands of the subscriber, thereby enabling beneficial terms of pricing with the subscriber as the decision maker. The techniques described herein allow the subscribers to choose not just a single service bundle, but a multitude of services from multiple providers.

Figure 3:
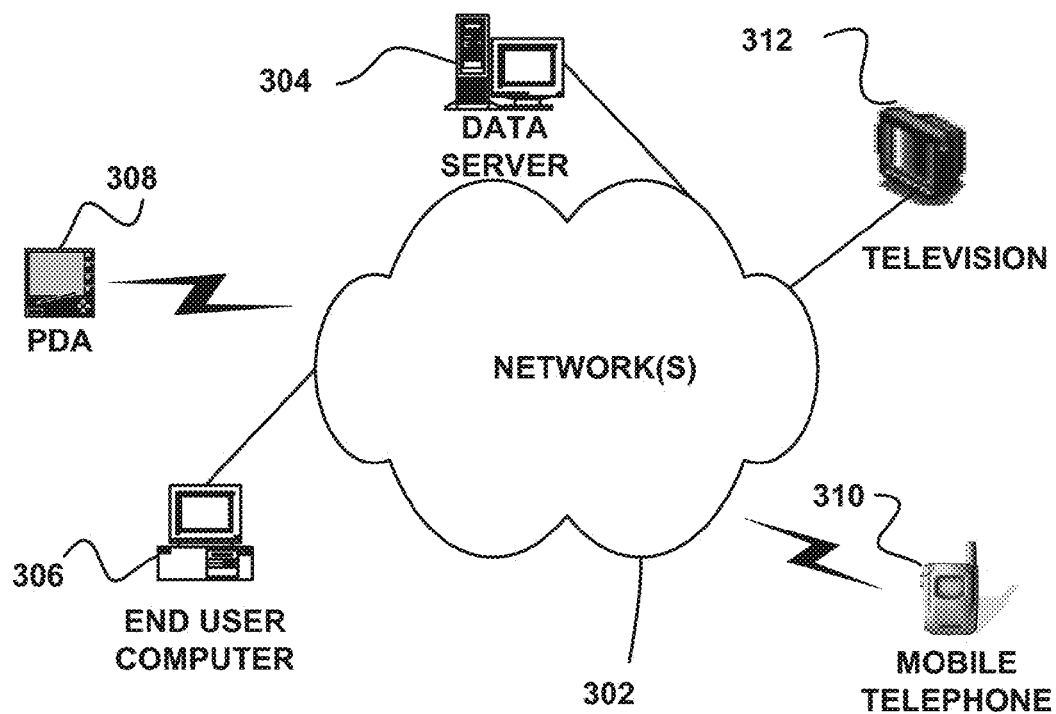
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
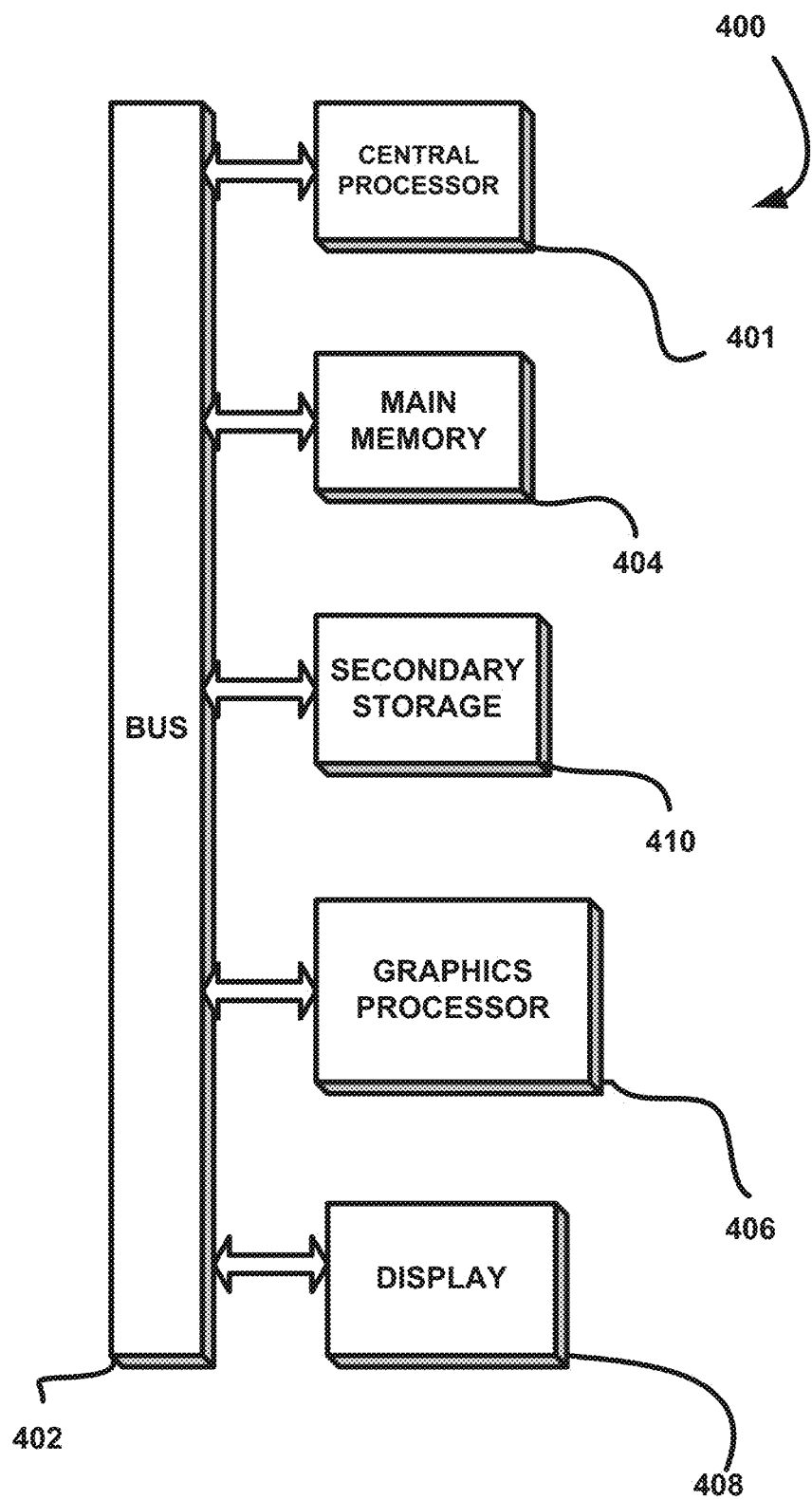
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    determining, for a mobile device, a plurality of mobile services provided by at least one mobile service provider and available in a zone outside of a home network of the mobile device, the mobile services including at least one voice service, at least one data service, and at least one voice over internet protocol (VoIP) service;

offering the determined mobile services to a user of the mobile device;

receiving a selection from the user of at least two of the mobile services;

for each of the selected mobile services:
generating an agreement associated with the selected mobile service, the agreement being between the user and the mobile service provider of the selected mobile service, providing information associated with the agreement to a home network operator providing the home network of the mobile device, and authorizing the selected mobile service for the mobile device such that the mobile service provider of the selected mobile service is capable of delivering the selected mobile service to the mobile device when the mobile device is in the zone outside of the home network of the mobile device.

2. The method of claim 1, wherein the one or more mobile services in the zone outside of the home network of the mobile service subscriber are roaming services.

3. The method of claim 1, wherein authorizing the selected mobile services for the mobile device functions such that the selected mobile services are capable of being used by the mobile device without a change in subscriber resources.

4. The method of claim 3, wherein the subscriber resources include one or more of an IMSI (International mobile Subscriber Identity), a mobile number, a handset, or a SIM (subscriber identity module).

5. The method of claim 1, wherein the mobile service subscriber is capable of selecting a plurality of mobile services from different mobile service providers.

6. The method of claim 1, wherein, in response to receiving the information associated with the agreement, the home network operator authenticates and validates the user of the mobile device.

7. The method of claim 6, wherein the home network operator stores the information associated with the agreement.

8. The method of claim 1, wherein the home network operator is not responsible for charging for the use of the selected mobile services by the mobile device.

9. The method of claim 1, further comprising providing confirmation of authorization of the selected mobile services to the mobile device.

10. The method of claim 1, wherein offering the determined mobile services to the user of the mobile device occurs prior to the mobile device entering the zone outside of the home network of the mobile device.

11. The method of claim 1, wherein offering the determined mobile services to the user of the mobile device occurs subsequent to the mobile device entering the zone outside of the home network of the mobile device.

12. The method of claim 1, wherein the home network operator provides the information associated with the agreement to the mobile service provider of each selected mobile service.

13. A computer program product embodied on a non-transitory computer readable medium, comprising:
computer code for determining, for a mobile device, a plurality of mobile services provided by at least one mobile service provider and available in a zone outside of a home network of the mobile device, the mobile services including at least one voice service, at least one data service, and at least one voice over internet protocol (VoIP) service;

computer code for offering the determined mobile services to a user of the mobile device;

computer code for receiving a selection from the user of at least two of the mobile services;

for each of the selected mobile services:
computer code for generating an agreement associated with the selected mobile service, the agreement being between the user and the mobile service provider of the selected mobile service, computer code for providing information associated with the agreement to a home network operator providing the home network of the mobile device, and computer code for authorizing the selected mobile service for the mobile device such that the mobile service provider of the selected mobile service is capable of delivering the selected mobile service to the mobile device when the mobile device is in the zone outside of the home network of the mobile device.

14. A system comprising:
a memory system; and
one or more processing cores coupled to the memory system and that are each configured to:
determine, for a mobile device, a plurality of mobile services provided by at least one mobile service provider and available in a zone outside of a home network of the mobile device, the mobile services including at least one voice service, at least one data service, and at least one voice over internet protocol (VoIP) service;

offer the determined mobile services to a user of the mobile device;

receive a selection from the user of at least two of the mobile services;

for each of the selected mobile services:
generate an agreement associated with the selected mobile service, the agreement being between the user and the mobile service provider of the selected mobile service, provide information associated with the agreement to a home network operator providing the home network of the mobile device, and authorize the selected mobile service for the mobile device such that the mobile service provider of the selected mobile service is capable of delivering the selected mobile service to the mobile device when the mobile device is in the zone outside of the home network of the mobile device.

* * * * *